United States Patent [19]

Annunziata et al.

[11] 3,964,054

[45] June 15, 1976

[54] HIERARCHY RESPONSE PRIORITY ADJUSTMENT MECHANISM

[75] Inventors: Eugene Joseph Annunziata, Hyde Park; Neal Taylor Christensen, Poughkeepsie, both of N.Y.

[73] Assignee: International Business Machines Corporation, Armonk, N.Y.

[22] Filed: June 23, 1975

[21] Appl. No.: 589,228

[52] U.S. Cl. ............................................. 340/172.5
[51] Int. Cl.² ........................................... G06F 9/18
[58] Field of Search ...................... 340/172.5; 445/1

[56] References Cited
UNITED STATES PATENTS

| | | | |
|---|---|---|---|
| 3,588,829 | 6/1971 | Roland et al. | 340/172.5 |
| 3,670,309 | 6/1972 | Amdahl et al. | 340/172.5 |
| 3,701,977 | 10/1972 | Mendelson et al. | 340/172.5 |
| 3,800,292 | 3/1974 | Curky et al. | 340/172.5 |
| 3,812,473 | 5/1974 | Tucker | 340/172.5 |

*Primary Examiner*—Mark E. Nusbaum
*Attorney, Agent, or Firm*—Bernard M. Goldman

[57] ABSTRACT

A response priority circuit arrangement for determining the priority among simultaneous responses from different access-time levels L3 and L2 in a storage hierarchy to maintain nearly the same order among the simultaneous responses as the order of their storage access requests.

The storage requests were put into an indexed slot in a hardware queue. The index of the assigned queue slot is sent to a basic storage module (BSM) part of the hierarchy which is selected by the storage address supplied by the processor making the storage request. The selected BSM will have the requested data either in its main memory part (L3) or in its high-speed buffer part (L2).

The priority circuit arrangement has a separate group of AND gates for each hierarchy level L3 and L2. The groups are interlocked by a circuit which disables the L2 group if any AND gate is enabled in the L3 group. Only one AND gate can be enabled in both L3 and L2 groups. When simultaneous responses are signalled from the L3 and L2 levels, the L3 gate is given priority since the L3 response resulted from an earlier request than the L2 response. The output of the enabled AND gate indicates the index of the slot in the queue which contains the request matching the response given priority. A bus connection can then be made using that slot's information for the data transfer between the selected BSM and the requesting processor.

6 Claims, 4 Drawing Figures

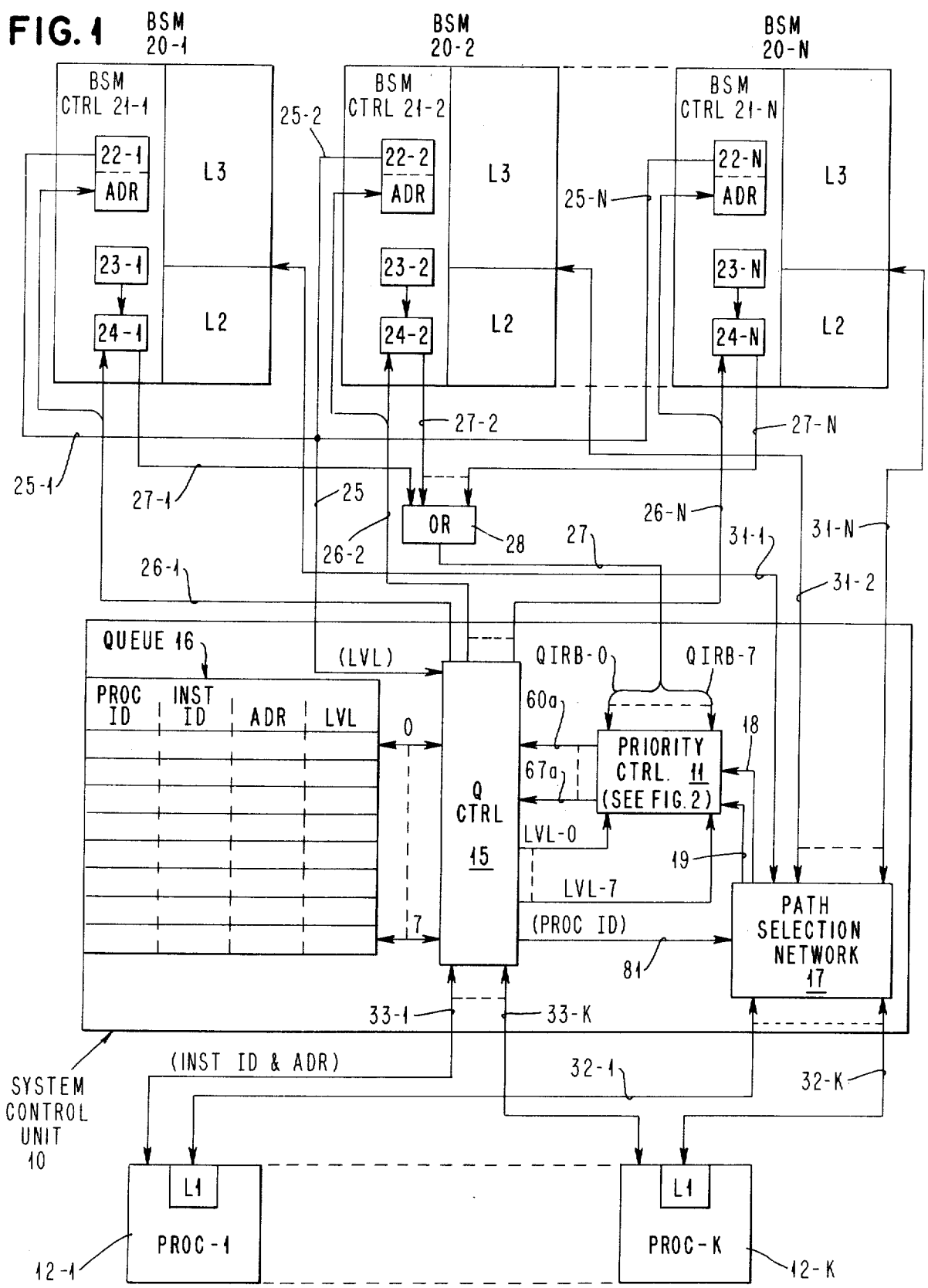

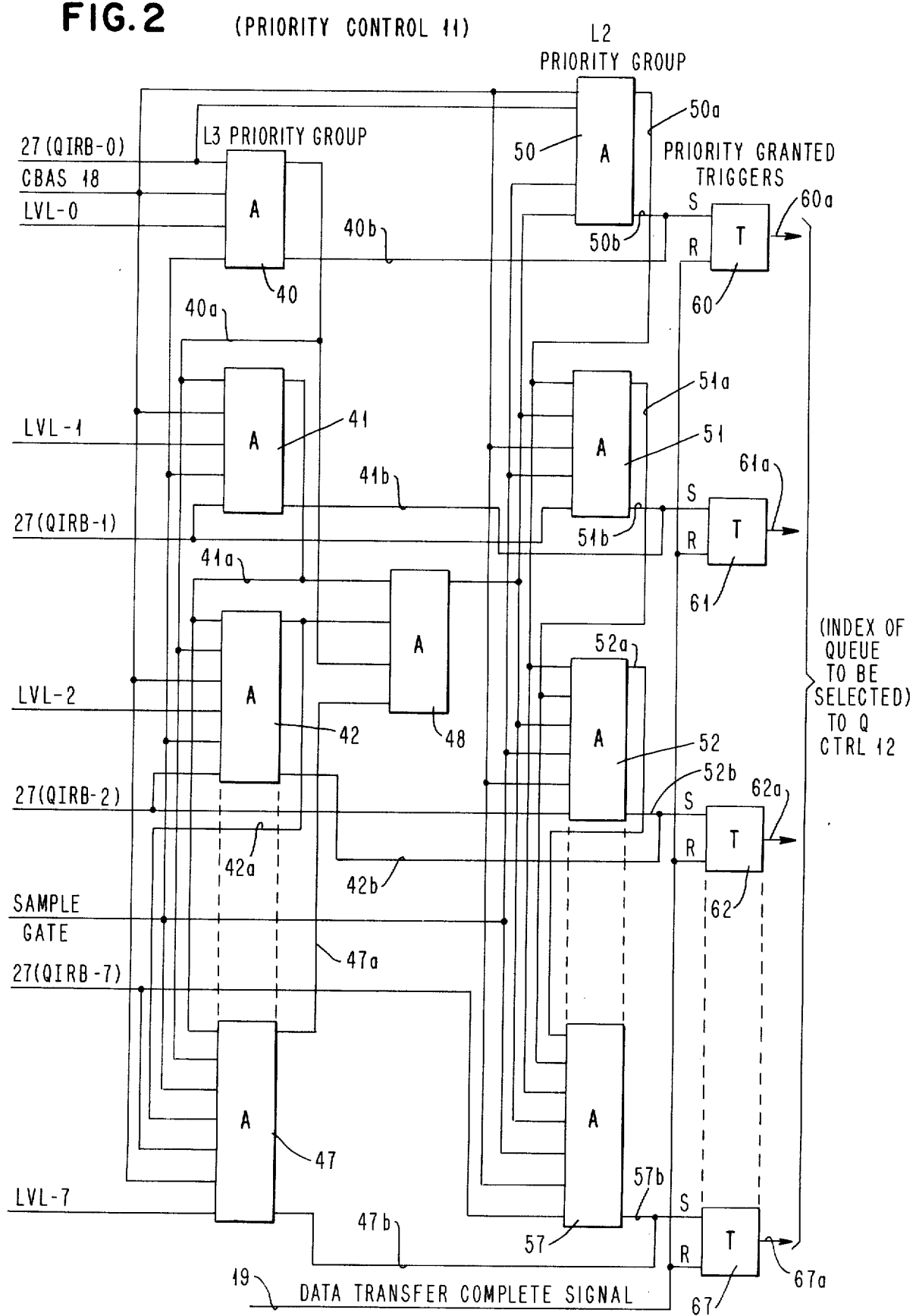
FIG. 2 (PRIORITY CONTROL 11)

FIG.3  LEVEL DETERMINING MEANS 22
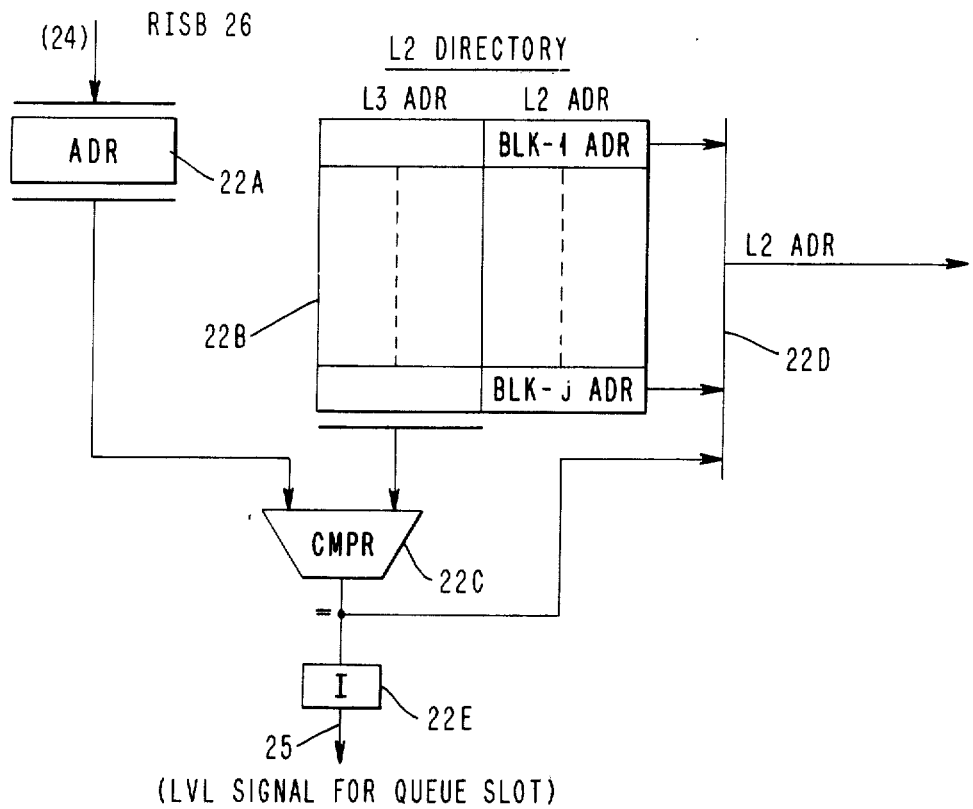
FIG.4
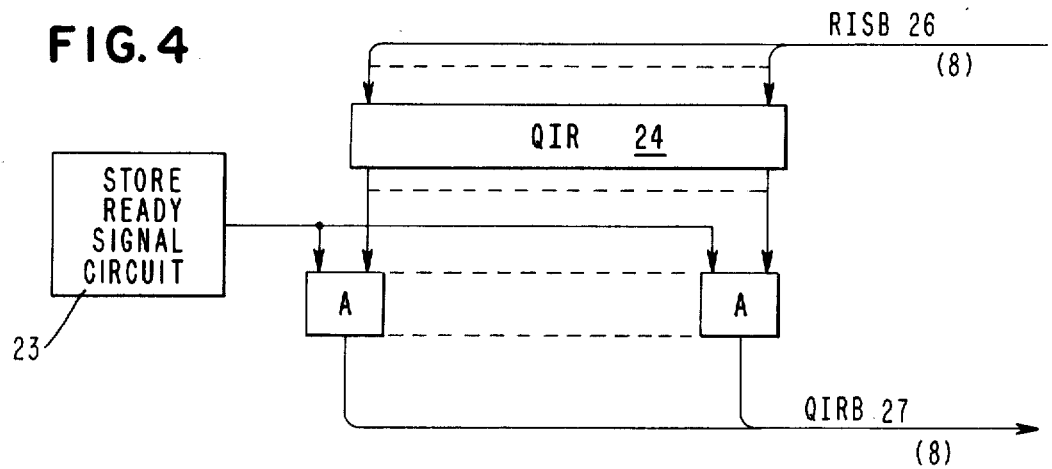

HIERARCHY RESPONSE PRIORITY ADJUSTMENT MECHANISM

BACKGROUND OF THE INVENTION

1. Field Of The Invention

This invention deals with controlling the priority of responses (as opposed to the priority of requests) from a hierarchical store when simultaneous responses are to be handled on a common bus transfer path.

2. Description Of The Prior Art

The prior art on storage priority controls has been noted to use (1) a predetermined priority relationship among simultaneous requests (i.e. demands), and (2) to use different conditions to control priority among simultaneous demands (requests). This invention does not use either (1) or (2) but uses simultaneous responses from hierarchy levels to grant priority among the responses. Examples of prior art are as follows:

U.S. Pat. No. 3,353,160 to A. B. Lindquist provides a system in which priority is controlled by the request position in a tree queue arrangement.

U.S. Pat. No. 3,543,242 to R. L. Adams provided for establishment of priority based on a predetermined priority order among simultaneous input requests. Priority is based on an assigned priority list and the time of each arrival of requests. Higher priority is given when overrun is anticipated.

U.S. Pat. No. 3,478,321 to J. C. Copper et al. discloses a priority system in which request priority is lowered by the busy condition of either a requesting unit or a requested store unit.

U.S. Pat. No. 3,208,048 to Kilburn et al establishes a predetermined request priority based on interrupt requests to different speed devices. A fixed request priority is given according to level. Concurrent transfers to main store 10 from first level substore 54 (drum) and second level substore (55) tape are interleaved by alternating transfer control program.

SUMMARY OF THE INVENTION

The invention uses response priority among simultaneous responses to maintain nearly the same order among the simultaneous responses from different access time levels in storage as the order in which their storage access requests were issued by one or more processors, without providing a full implementation of a first in-first out network.

The invention determines response priority by the access speed of the different levels of storage which are responding. Simultaneous responses from the same storage level have their priority determined by a predetermined relationship among their requests, i.e. queue index assignment.

The invention operates with a special type of storage hierarchy in which different levels of the hierarchy have different response rates and are addressable by programmed instructions. For example, the invention can be used in a computer system having a high speed buffer between its cache and main store, wherein the buffer receives blocks of data in congruence classes similarly to the way in which data is mapped in a current processors cache. Just as instruction requested data may not then be found in the cache, the data might also not then be found in the high speed buffer, and then it is called from the slower speed main store. The cache, high speed buffer, and main store form the upper end of a storage hierarchy, and they may be called Level 1 (L1), Level 2 (L2) and Level 3 (L3), respectively. It makes no logical difference to an executing instruction whether its addressed data is in L1, L2 or L3.

With the invention, a storage request for data is first put in any available slot in a hardware storage request queue in a system control unit. Response priority is normally determined by the index of the queue slots, e.g. the lowest index having highest priority. Upon entering the request in a queue slot, the request is signalled to the hierarchy, which assigns it to the storage module in the hierarchy which is to respond to the request.

It is possible that many different storage modules will have received requests, and they will be in the process of independently accessing the requested data.

When any hierarchy storage module is ready to respond with the requested data, it sends a "storage response control signal" to the priority circuit in the system control unit.

The storage response control signals can be received by the priority circuit out of the order in which the requests are made, when the responses of the different levels of the storage hierarchy are responding. As long as a single level of the hierarchy is being accessed, no serious performance problems occur if the requests are serviced out of the order in which the priority control network received the requests from the processors, since requests to any one level are serviced at the same speed. However, should a slower speed level of the hierarchy require accessing and if the queue slot selected for that request happened to have a higher priority index, it is possible that later requests going to a higher speed level of the hierarchy could be given a higher priority (in case of simultaneous responses) than the earlier request to the lower speed level.

If simultaneous responses occur from different levels in the hierarchy, it is implicit that the request to the slower responding level occurred before the request to the faster responding level, hence if priority is given to the slower level's response, the simultaneous responses will be forced to have the same order as their respective requests.

The invention requires that the storage hierarhy, upon receiving a request, issue a signal to the system control unit to indicate which hierarchy level will respond. This priority control signal from the responding unit is used in the event there are simultaneous response control signals from different levels in different BSM's in the storage hierarchy, to cause the priority of the responses to be altered so that priority is granted to the slower level.

BRIEF DESCRIPTION OF THE DRAWINGS

FIG. 1 illustrates a system containing the invention.

FIG. 2 shows an embodiment of priority control 11 found in the system control unit 10 of the system of FIG. 1.

FIG. 3 represents a detailed form of the level determining means 22 found with each basic storage module (BSM) in FIG. 1.

FIG. 4 is a detailed view of the queue index register (QIR) 24 and associated circuits found in each BSM control shown in FIG. 1.

DESCRIPTION OF THE PREFERRED EMBODIMENT

FIG. 1 illustrates an embodiment of a system in which the invention is used. The system includes a plurality of instruction processors 12-1 through 12-K. Each process contains a cache L1 for containing data used in the execution of programmed instructions. Each cache L1 is connected to a respective one of the processor data transfer buses 32-1 through 32-K on which the respective cache receives data from storage and transfers its result data to storage.

The system storage is comprised of a plurality of basic storage modules (BSM's) 20-1 through 20-N. Each BSM is comprised of two storage parts L2 and L3, in which the L3 part has large capacity storage and slow access, while the L2 part has smaller storage capacity and faster access. The L3 part may be made of conventional monolithic, transistor, or core storage in a size that may comprise hundreds of thousands of bytes. The L3 parts of all of the BSM's together comprises a single main memory which is addressed as an entity by each processor. Thus, the L2 part of each BSM is a buffer, which has much smaller byte capacity than its associated L3 part but is significantly larger than a L1 cache. The L3 processor data address specifies both a BSM and a byte address in the L3 part of the addressed BSM. Whenever data is first referenced in L3, the congruence block of data which contains the data in L3 is transferred into L2. The transferred block is sometimes called an L2 congruence class, and may have the same congruence class arrangements found in conventional computer processor caches. Later references to data in the block are made in the L2 part.

Each BSM is connected to a respective one of data transfer buses 31-1 through 31-N, all of which connect to a common path selection network 17 to which the processor data transfer buses 32-1 through 32-K are also connected. Network 17 operates as a cross bar type of switch to connect a selected one of the BSM data transfer buses 31 to a selected one of processor data transfer buses 32 at any given time under the control of signals in a system control unit 10.

Each cache L1 and all of the BSM parts L2 and L3 comprise a storage hierarchy in which L1 has the fastest access time, L2 has an intermediate access time, and L3 has the slowest access time. Thus, the computer system can execute its instructions fastest if it can find the data in L1. If not, it can operate at its next fastest rate if it can find the data in L2. The computer operates at a still slower rate if it can not find the data in L1 or L2 but instead finds it in the L3 of one of the BSM's.

Thus, in FIG. 1 when a processor is executing an instruction which does not have a required operand in its cache L1, the processor makes a request for the data on a respective one of control buses 31-1 through 31-K to the system control unit 10 and sends it the L3 address (ADR) of the data, the processor identifier (PROC ID), and an instruction identifier (INST ID). The INST ID identifies the instruction for which the data request is made, and ADR identifies which of its operands is requesting the data. Other data may be also sent to unit 10, such as whether the request is for a fetch or store operation in the storage hierarchy. This information is sent on the processor's control bus, which is one of buses 33-1 through 33-K, to a Q (Queue) Control 15. Queue control 15 assigns an available slot in queue 16 located by one of its indices 0 through 7. The transferred PROC ID, INST ID, and ADR are then put by Q control 15 into respective fields in the assigned slot in queue 16. The data L3 address in the ADR field identifies the BSM which will contain the data and the location of the data in that BSM's L3 part. For example, the high-order bits in the data address in the ADR field can identify the particular BSM and the low-order bits in ADR locate the data in the identified BSM.

The Q control 15 then selects the one of request signal buses (RSB) 26-1 through 26-N which is connected to the addressed BSM. Then Q control 15 sends the ADR and the assigned slot index on the RSB to the BSM control 21 with addressed BSM. The request signal buses 26-1 through 26-N have one subset of lines respectively connected to a queue index register (QIR) of 24-1 through 24-N in the selected BSM control and have another subset of lines respectively connected to a register ADR in each level determining means (LDM) 22 in the respective BSM controls 21-1 through 21-N. The slot index is signalled by a "one" state on a selected one of eight lines in the subset in bus 26 corresponding to the assigned slot index, wherein the other seven lines have a "zero" state.

FIG. 3 illustrates in more detail the structure of each level determining means 22. It shows the ADR register 22A which receives the requested L3 address. LDM 22 also contains a L2 directory 22B which is an index of the current content in the L2 part of that BSM, in which each directory represents the congruence classes (i.e. addresses of blocks of data) in the L2 buffer. Each directory entry contains the L2 address of a data block (BLK) in L2 and its corresponding L3 address. Low-order bits in register 22A provide the byte address in a selected L2 block.

Upon receipt of an L3 address in register 22A in response to a processor request for data to the system control unit 10, the LDM immediately responds with the LVL signal on bus 25 to SCU 10 indicating whether or not the L3 address is represented in the L2 directory. If ADR is not in the L2 directory, the data must be accessed in L3. LDM 22 does this by comparing all of its L3 addresses against the L3 address in register 22A in a compare circuit 22C. If any L3 address in the directory compares equal, a control signal is provided through an inverter 22E to one of the control lines 25-1 through 25-N, which are combined by ORing them into line 25 to Q control 15 which controls the setting of a bit in the LVL (Level) field in the queue slot located at the currently assigned index. By setting the assigned LVL field to a "one" state in response to no compare signal, the slot indicates that the requested information transfer will be to or from the L3 part of the BSM. However, if a compare equal signal is provided on line 25, the LVL field of the assigned slot will not be set by the inverter output, and its unset state, e.g. state "zero," indicates that the data will come from the L2 part in that BSM.

Also in FIG. 3, an equal signal from compare circuit 22C enables an AND gate 22D to provide from the directory the L2 address of the block containing the data corresponding to the provided L3 address in register 22A, so that the L2 buffer can begin a conventional cycle for accessing that data address; and near the end of the accessing cycle it will be ready to send or receive the requested transfer at that address.

If no equal signal is provided by the compare circuit 22C, the required data is not in L2 and must be transmitted to or from the slower L3 part of that BSM, which then begins its conventional cycle of accessing the L3 addres in LDR 22.

At the end of an accessing cycle by L2 or L3, the L2 or L3 BSM part will be conditioning the required data address and be ready to begin the transfer of the data on a data transfer path which comprises its respective data transfer bus 31, path selection network 17 and processor data bus 32 to the identified processor 12.

In summary, the request to SCU 10 is transferred to an addressed BSM by the queue control 15 transmitting on a selected RSB 26 the required L3 address to the respective LDM 22 and the assigned queue slot index to a QIR 24 in the connected BSM control 21. The assigned queue index is thus stored in that QIR 24, from which it will be used later as a response signal on a bus 27 to the system control unit 10 when the requested storage access is ready for transmission on the data transfer path through network 17.

Thus, whenever a BSM is ready to respond with a requested data access, it transmits the stored index in QIR 24 to the Q control 15 as its ready-to-respond signal. This index response signal is provided on 8 lines in the respective one of buses 27-1 through 27-N, in which each of the 8 lines signals a different bit position in the respective QIR register 24. An OR circuit 28 OR's together the same bit position outputs from all of the response registers 24. Thus, it Or's together bit positions 0 from all QIR registers to provide signal line QIRB-0, and so on until it OR's together the last bit positions 7 from all of the QIR registers 24 to provide the signal line QIRB-7. The eight ORed response signal lines QIRB-0 through QIRB-7 are inputs to priority control 11.

FIG. 4 provides more detail regarding QIR 24. A storage ready signal circuit 23 provides a signal near the end of the conventional access cycle when the data address has been accessed in the L2 or L3 part of the BSM. This occurs after the decoding of the address for accessing the required location in L2 or L3. The store ready signal from circuit 23 begins a storage response operation by enabling a set of AND gates in the BSM control 21 to outgate the index stored in the QIR 24 onto the queue index response bus (QIRB) 27 which sends the index back to queue control 15, and simultaneous responses provide ORed indices to queue control 15. Then control 15 uses the ORed responding indices to locate each pertinent slot in queue 16, in order to grant priority and control the requested transfer of data for one request at a time in FIG. 1. The PROC ID field in a selected queue slot identifies the particular processor which requested the data, and it is sent on line 81 to identify the transfer bus 32 which must be selected by path selection network 17 for connection to the BSM bus 31 from the requesting BSM to transfer the data to the required processor.

The invention recognizes that a large number of storage access requests to many of the BSM's may be outstanding at any time in queue 16 (i.e up to 8 different requests in the 8 slots). Because of the difference in response times between L2 and L3, it is possible for a later request to one BSM to have an earlier response from its L2 than some earlier request which requires a response from the L3 part of another BSM. This invention assures that if two BSM's provide index response signals simultaneously on QIRB bus 27, that the BSM signalling an L3 response will get priority over the response from another BSM signalling an L2 response, since the L3 data request occurred before the L2 data request. That is, the L3 access time is longer than the L2 access time which thereby signifies that the request for the L3 access occurred before the request for the L2 access.

The priority control 11 determines the priority between simultaneous L2 and L3 responses from different BSM's, by assuring that the L3 response gets priority. FIG. 2 illustrates in detail an embodiment of priority control 11. It includes an L3 priority group of AND gates and an L2 priority group of AND gates; each group having one AND gate per slot in queue 16. Thus, the L3 priority group comprises AND gates 40 through 47, while the L2 priority group comprises AND gates 50 through 57. An AND gate 48 (operating logically as an OR circuit) interlocks group 40–47 with group 50–57. Whenever two or more BSM's are simultaneously outputting index signals on their QIRB's, their outputted indices are ORed together in OR circuit 28 in FIG. 1 which provides the respective inputs QIRB-0 through h QIRB-7 to the respective AND gates 40,50 . . . 47,57. It will be remembered that the index in any QIR 24 is represented by a single bit position being set to the "one" state out of the 8 bit positions in the QIR. The set bit position indicates the index assigned to the queue slot containing the request currently being serviced by the respective BSM. The Oring operation by OR circuit 28 can thus simultaneously signal the slot indices of all slots containing requests being simultaneously responded to.

In FIG. 1, the path selection network 17 has an output CBAS (common bus availability signal) line 18 which provides an output signal to priority control 11 whenever path selection network 17 is not being used. This CBAS signal conditions the AND gates 40–47 and 50–57 in FIG. 2.

Each of the AND gates 40–47 also receives LVL lines LVL-0 through LVL-7 from Q control 15 derived respectively from simultaneous indication of all of the LVL fields in the eight queue slots. An L3 setting (i.e. "one" bit) in any LVL field activates the respective LVL line. Thus, if any LVL bit is set to the L3 state in any one or more of the queue slots, then it will condition the corresponding one or more of AND gates 40–47.

However, only one AND gate in both groups 40–47 and 50–57 can be enabled at one time due to interlocks built into the circuit. An enabled AND gate in the L3 group is associated with the lowest index receiving enabling QIRB aND LVL signals. An interlock among gates 40–47 is provided by complementary outputs, i.e. 40a, 40b, etc., being connected to inputs of all higher indexed AND gates in the group, thereby allowing only one L3 AND gate to be enabled.

If any AND gate is enabled in the L3 group 40–47, then no AND gate can be enabled in the L2 group 50–57, due to the interlock operation by AND circuit 48 receiving the complementary outputs 40a through 47a. AND gate 48 provides its output as a disabling input to all of the AND gates 50–57 in the L2 priority group.

Each AND gate 40–47 in the L3 group has its true output 40b–47b also connected to the set input of a corresponding one of priority granted triggers 60–67. Likewise, each true output 50b–57b in the L2 group is connected respectively to the set inputs of triggers 60–67. The outputs 60a through 67a of the priority granted triggers are connected to queue control 15 to cause the read out of one queue slot, corresponding to the one priority granted trigger which may be set at any one time. The read out queue slot has its PROC ID field provided on line 81 from the queue control 15 to path selection network 17 to enable network 17 to connect the required one of the processor transfer buses 32-1 through 32-K to the selected one of the BSM data transfer buses 31-1 through 31-N. The INST ID and ADR fields in the read out slot are provided to the selected processor on the corresponding one of control buses 33-1 through 33-K to identify to the processor the instruction and its operand which previously made the request which is now being responded to. Once a slot is read out, queue control 15 marks the index of that slot as being available for a subsequent assignment by a future processor requires for a data transfer to or from storage.

In some systems a common data transfer path can be common to a subset of the BSM's and processors in a system. It is readily apparent that this invention is just as applicable to each subsystem having a common data transfer path by providing each such subsystem with its own system control unit 10 of the type disclosed herein.

The details of the path selection network and controls are similar to those found in the art, such as may be found in U.S. Pat. No. 3,626,427 to MacSorley et al., patented Dec. 7, 1971, in the FIGS. 9, 10 and 11 described in Sections 6.0 through 6.3.

It will be understood that changes, such as the number of BSM's, size of BSM's, number of slots and fields in the queue, and number of processors are within the scope of this invention and the following claims.

While the invention has been particularly shown and described with reference to a preferred embodiment thereof, it will therefore be understood by those skilled in the art that the foregoing and other changes in form and detail may be made therein without departing from the spirit and scope of the invention.

What is claimed is:

1. A system for controlling the priority of simultaneous responses to plural requests for data from different levels of a computer storage hierarchy, including a plurality of different levels having different data access rates, the hierarchy including means for initially responding with a level signal indicating which level is to respond to the request for data transfer, simultaneous responses competing for a common transfer path for moving the requested data, comprising a queue in a priority control network, the queue including a plurality of indexed slots, the indexed slots receiving requests for data from a computer, level-determining means in said hierarchy providing the level signal to the priority control network for indicating the hierarchy level which is to respond to each request put into a queue slot at a particular index in the queue, a plurality of basic storage modules in said hierarchy, each module containing at least two different access-time levels in the hierarchy, register means in each module for storing an index signal from the priority control network indicating the particular index of the queue slot containing the request to be responded to, response control signal means in each module for providing to the priority control network index signal stored in the register means when the module is ready for a transfer of data, each response control signal means operating independently of other response control signal means in other modules, the priority control network also including:

a plurality of intra-level priority control circuits receiving each provided index signal from a responding module, each respective intra-level priority control circuit servicing a different level in the hierarchy, inter-level connecting means between the intra-level priority control circuits to disable each higher-level priority control circuit when a slower-level priority control circuit is receiving the level signal from the level determining means, one of the intra-level priority control circuits being activatd by the level signal, means receiving the output of the activated intra-level priority control circuit to provide to the queue an index output signal corresponding to a selected one of one or more provided index signals received from one or more respective response control signal means, thereby giving priority to a data transfer by the module assigned to the selected index signal.

2. A priority control system for controlling priority between simultaneous responses resulting from plural requests for data from different levels in a computer storage hierarchy, including a plurality of different levels having different data access rates, including a queue for storing requests in assigned index slots, the hierarchy including means for initially responding with a level signal indicating which level is to respond to each request for a storage data transfer, and later providing a response signal when the hierarchy is ready to respond with a requested storage access, simultaneous responses competing for a common transfer path for moving the data for the requested storage access, the priority control system comprising a plurality of basic storage modules (BSM's), each BSM containing at least two levels of the hierarchy, the BSM's being capable of receiving independent requests for storage access, each BSM storing an assigned index signifying receipt of a request, and the BSM including means responsive to receipt of a request for providing a level signal indicating which of its levels is to respond to a request, queue control means for storing in an assigned index slot the level signal received from any BSM, the queue control means providing a level signal output from each indexed slot, response means with each BSM for transmitting its stored assigned index as a response index signal to the queue control means when the BSM is ready to respond with the data access, combining means for combining simultaneous response index signals from different levels of the hierarchy, and providing respective index output lines for the slots in the queue, a first plurality of AND gates associated with a low access rate level in the hierarchy, each AND gate in the first plurality associated with a different slot in the queue and having inputs respectively connected to a respective one of the level signal outputs and a respective one of the index output lines, a complementary output of each AND gate in said first plurality being connected to an input of all AND gates in said first plurality associated with a higher index, a disabling circuit connected to outputs from each of the AND gates in the first plurality, the disabling circuit providing a disabling output when any AND gate in the first plurality is enabled, a second plurality of AND gates associated with a higher access rate level in the hierarchy, each AND gate in the second plurality associated with a different slot in the queue and having inputs connected to a respective one of the level signal outputs and a respective one of the index output lines, another input to each AND gate in said second plurality being connected to the disabling output of said disabling circuit, a complementary output of each AND gate in said second plurality being connected to an input of all AND gates in said second plurality associated with a higher index, whereby one AND gate in said first and second plurality provides a priority index signal when simultaneous response signals are received to enable readout of a correspondingly indexed slot in the queue.

3. A priority control system as defined in claim 2, which further includes a plurality of priority-granted triggers respectively associated with the indexed slots in the queue, the set input of each priority-granted trigger connected to the outputs of correspondingly indexed AND gates in the first and second plurality, and data transfer complete signal means providing a reset input to all of said priority granted triggers when each data response is completed.

4. A priority control system as defined in claim 2, further comprising means for sensing when a data transfer path from said hierarchy is not in use, and an input to each of the AND gates in said first plurality and said second plurality being connected to said sensing means to condition the AND gates.

5. A priority control system for controlling priority between simultaneous responses resulting from plural requests for data from different levels in a computer storage hierarchy, including a plurality of different levels having different data access rates, including a queue for storing requests in assigned index slots the hierarchy including means for initially responding with a level signal indicating which level is to respond to each request for a storage data transfer, and later providing a response signal when the hierarchy is ready to respond with a requested storage access, simultaneous responses competing for a common transfer path for moving the data for the requested storage access, the priority control system comprising a first plurality of AND gates associated with a low access rate level in the hierarchy, each AND gate in the first plurality having a first input line for being respectively connected to a level signal for a distinct request signal, each AND gate in the first plurality having a second input line for receiving an index response signal from a part of said hierarchy which is ready to respond, the index response signal representing an index in the queue storing the request bieng responded to, a complementary output of each AND gate in said first plurality being connected to an input of all AND gates in said first plurality associated with a higher index than the AND gate providing the complementary output, a disabling circuit connected to outputs from each of the AND gates in the first plurality, the disabling circuit providing a disabling output when any AND gate in the first plurality is enabled, a second plurality of AND gates associated with a higher access rate level in the hierarchy, each AND gate in the second plurality corresponding to an AND gate in the first plurality, each AND gate in the second plurality having two input lines respectively connected to the first and second input lines of the corresponding AND gate in the first plurality, another input to each AND gate in said second plurality being connected to the disabling output of said disabling circuit, a complementary output of each AND gate in said second plurality being connected to an input of all AND gates in said second plurality associated with a higher index than the AND gate providing the complementary output, whereby one AND gate in said first and second plurality provides a priority controlling index output when simultaneous index response signals are being provided by plural levels in the hierarchy to give priority to a response from the low access rate level when simultaneous with a response from the higher access rate level.

6. A priority control system as defined in claim 5 in which:

the low access rate level in the hierarchy is the main store level in a computer system, and the higher access rate level includes buffers between the main store and at least one processor in the computer system.

* * * * *